(12) United States Patent  
Waid (10) Patent No.: US 7,210,545 B1
(45) Date of Patent: May 1, 2007

(54) MOTORIZED BEACH CART (76) Inventor: Jerry Paul Waid, 4270 Bishop Lake Rd., Marietta, GA (US) 30062

( * ) Notice: Subject to any disclaimer, the term of this patent is extended or adjusted under 35 U.S.C. 154(b) by 94 days.

(21) Appl. No.: 11/031,917

(22) Filed: Jan. 7, 2005

(51) Int. Cl.
B60K 1/00 (2006.01)

(52) U.S. Cl. .................. 180/65.1; 180/19.1; 280/47.34

(58) Field of Classification Search ............... 180/19.1, 180/19.2, 19.3, 65.1; 280/47.11, 47.34, 654, 280/47.35, 47.36, 47.371, 47.38, 47.39, 47.4, 280/47.41

See application file for complete search history.

(56) References Cited

U.S. PATENT DOCUMENTS

| | | | | |
|---|---|---|---|---|
| 2,903,082 | A * | 9/1959 | Marcus | 180/19.1 |
| 2,918,133 | A | 12/1959 | Ericsson | |
| 3,266,813 | A | 8/1966 | Bosko et al. | |
| 3,485,314 | A | 12/1969 | Herr | |
| 3,677,571 | A * | 7/1972 | Maturo et al. | 280/654 |
| 3,704,758 | A * | 12/1972 | Cropp | 180/19.1 |
| 3,791,470 | A | 2/1974 | Baddorf et al. | |
| 3,874,531 | A * | 4/1975 | Mayo | 414/680 |
| 4,137,984 | A | 2/1979 | Jennings | |
| 4,203,609 | A | 5/1980 | Mitchell | |
| 4,796,909 | A * | 1/1989 | Kirkendall | 280/651 |
| 4,807,716 | A | 2/1989 | Hawkins | |
| 4,863,075 | A | 9/1989 | Romer | |
| 4,865,346 | A | 9/1989 | Carlile | |
| 4,887,837 | A | 12/1989 | Bonewicz | |
| 5,161,635 | A * | 11/1992 | Kiffe | 180/19.3 |
| 5,203,815 | A * | 4/1993 | Miller | 43/21.2 |
| 5,269,157 | A | 12/1993 | Ciminelli | |
| 5,333,885 | A * | 8/1994 | Pullman | 280/47.19 |
| 5,380,022 | A | 1/1995 | Dennis | |
| 5,876,047 | A * | 3/1999 | Dennis | 280/47.35 |
| 5,960,720 | A * | 10/1999 | Borland et al. | 108/53.1 |
| 6,070,679 | A * | 6/2000 | Berg et al. | 180/19.2 |
| 6,131,925 | A | 10/2000 | Weldon | |
| 6,148,942 | A * | 11/2000 | Mackert, Sr. | 180/65.6 |
| 6,386,557 | B1 * | 5/2002 | Weldon | 280/30 |
| 6,533,298 | B2 * | 3/2003 | Sims | 280/47.26 |
| 6,550,791 | B2 * | 4/2003 | Ramsey | 280/47.19 |
| 6,648,349 | B1 * | 11/2003 | Waller et al. | 280/47.35 |
| 6,685,200 | B1 * | 2/2004 | Giannoni et al. | 280/47.35 |
| 6,796,319 | B1 * | 9/2004 | Patarra et al. | 135/16 |
| 6,845,991 | B1 * | 1/2005 | Ritucci et al. | 280/30 |
| 6,883,267 | B1 * | 4/2005 | Pruitt | 43/54.1 |
| 6,962,354 | B1 * | 11/2005 | Miller | 280/47.26 |
| 6,993,931 | B1 * | 2/2006 | Hamilton | 62/457.7 |
| 7,017,691 | B2 * | 3/2006 | Lu | 180/65.1 |

\* cited by examiner

Primary Examiner—Christopher P. Ellis
Assistant Examiner—John Walters (57) ABSTRACT An improved three-wheel motorized cart is described for transporting beach related items over sandy terrain. The cart includes a cargo frame for retaining items being transported or stored on the cart. A platform that aids in the removal of loose sand from items being loaded and transported. A steering and control handle attached to the rear of the cargo frame contains the electric motor control assembly that operates the electronic circuit utilizing a pulse code modulated speed control trigger and a direction switch. A propulsion assembly containing a rechargeable battery, two motorized front wheels utilizing geared motor assemblies and an electronic motor control circuit. A caster wheel assembly, with a center mounted raised band, is affixed to the rear of the platform to provide the capability to traverse soft sand and easy steering on a hard surface.

6 Claims, 14 Drawing Sheets

MOTORIZED BEACH CART

CROSS-REFERENCE TO RELATED APPLICATIONS

Not Applicable

FEDERALLY SPONSERED RESEARCH

Not Applicable

SEQUENCE LISTING OR PROGRAM

Not Applicable

BACKGROUND OF THE INVENTION

1. Field of Invention

This invention relates to utility carts, specifically to such utility carts that are used to transport items placed on the cart platform to a sandy beach location.

2. Background of the Invention

This invention relates generally to utility carts or caddies which are designed to help transport to a beach those items typically required for beach recreation, and more specifically this invention is related to a battery operated, motorized carrying cart.

This invention provides a battery operated, motorized carrying cart and a method for transporting beach items, or the like, which aids not only in the transportation but one which may also be used as a comfort station at the beach and which, in addition, is specially adapted for the transportation of three major beach items, an umbrella, a dry storage box and a cooler. In addition this invention provide a place to store beach items when not in use and it allows easy removal of beach sand before items are stored.

BACKGROUND OF THE INVENTION

1. Prior Art

The art of some form of cart with which to carry recreational items to a beach, which cart may then be used in some manner at a beach, is not new but. Current art demonstrates many ideas and designs encompassing many of the same ideas. However, the prior art devices are not widely deployed; therefore, obviously have failed to achieve acceptance. In fact, chairs, blankets, umbrellas, coolers, tote bags, radios, playpens, boggy boards, etc. are still awkwardly carried and dragged to a beach. A few of the more relevant prior art inventions designed to solve this problem are described below.

In U.S. Pat. No. 6,131,925, Weldon describes a beach buddy cart that provides an easy means to transport items held on the cart platform to a sandy beach location. The beach buddy is provided with a contoured back and foldable seat so that it can serve as a beach chair once at the beach. In addition, retaining rings provide for the secure carrying of a beach umbrella. However, Weldon does not address the reduction of manual labor required to transport objects thought soft sand.

U.S. Pat. No. 5,269,157, to Ciminelli describes an insulated beach box which is adapted to be wheeled or slid over terrain to reach a desired beach location. The beach box has a swivelally connected back which may be used as a handle when moving the box and as a seat back when sitting upon the box. The back includes a flexible member with pockets for storing personal items. While Ciminelli suggests that there is a need for a device to facilitate carrying utilitarian items to and from the beach, his invention also provides for a rather labor intensive method of transporting items.

Carlile, in U.S. Pat. No. 4,865,346, describes a collapsible cart, held together by the frictional engagement of its components and quickly disassembled, which may be used to carry articles to the beach. A picnic basket with folding shelf is attached to the cart above the cooler chest. Carlile provides for a single umbrella holder on one of the cart's side arms and beverage holders on the other side arm. On the rear of the cart, an auxiliary storage bag is removably attached.

U.S. Pat. No. 4,863,075, to Romer, details a "Beach Caddy". The beach caddy is used for transporting and storing items for recreational use at the beach and is provided with runners for drawing across sandy surfaces and detachable wheels for rolling over paved surfaces. An adjustable support is provided for retaining a beach umbrella and permitting the umbrella to be tilted in any desired direction. Detachable tables mounted on the sides of the caddy can be set up to support items transported by the caddy.

A beach caddie is described by Higson in U.S. Pat. No. 4,703,944 which incorporates a chair rack and platform assembly, and, when used in a horizontal position at the beach, provides a beach table. Although marginally described, the beach caddie apparently provides for the transportation of an umbrella and fishing poles as well as for their storage once at the beach. The table surface of the caddie has orifices sized to hold umbrella and fishing pole shafts (presumably in an upright position for use) and orifices to hold drinks.

Bonewicz, in U.S. Pat. No. 4,887,837, describes a carrier for transporting objects to the beach. Bonewicz describes a relatively straight-forward hand cart having a platform which either folds up parallel to the main platform and rails or rotates perpendicularly to form a carrying surface. An umbrella may be attached with its top end in the cup-like receptacle and the hook-like element encircling its lower end. It is not clear what happens when the umbrella diameter exceeds the size of the hook-like member.

While these devices of the prior art address some of the needs of a typical beach goer, it is clear that not one of the devices address the problems which are solved by the motorized beach cart of the present invention and, in particular, perhaps the most frequently encountered problem of beach activity is not met. Specifically, the amount of manual labor required to transport objects thought the soft sand at a beach limits the amount of comfort items that one can transport to a beach.

U.S. Pat. No. 4,807,716 by Hawkins discloses a motorized carrying cart having a pan bracket, and a plurality of wheels for supporting the carrying cart. A battery is positioned in a battery recess of the pan bracket. A pair of motors engage a pair of upper sprockets that are engaged to a lower sprocket through an endless chain. An electronic circuitry is electrically engaged between the battery and each of the drive motors. A method for transporting articles, or the like, with a motor cart whose handle may be pivoted forward such that a pin-point roller can receive rotary power take-off from the pair of front wheels that are being rotated from the cart being propelled by a drive motor.

U.S. Pat. No. 2,918,133 by Ericsson teaches a powered barrow or cart adapted for the handling and transportation of diverse materials. U.S. Pat. No. 3,266,813 to Bosko et al. discloses a mobile garden and refuse cart for safe, sanitary storage and sanitary cleanup or pickup service. U.S. Pat. No.

3,485,314 to Herr teaches an article carrying land vehicle with a cargo container and with an optional stowable riding attachment.

U.S. Pat. No. 3,791,470 by Baddorf et al. discloses a motorized wheelbarrow. U.S. Pat. No. 4,137,984 to Jennings et al. provides an automatic, self-guiding transporter having electrically driven wheels activated by a control mechanism that senses the magnetic field around a buried guide wire. U.S. Pat. No. 4,203,609 by Mitchell et al. teaches a transport cart of the type used in industrial-commercial applications for movement of articles, preferably those loaded on pallets. None of the foregoing prior art teaches or suggests the particular transport cart, or method for transporting, of this invention.

While these devices of the prior art address some of the needs of a motorized cart user, it is clear that the devices do not address the problems of the beach cart, which are solved by the motorized beach cart of the present invention and, in particular, perhaps a frequently encountered problem of transporting items to a beach is not met. Specifically, the mechanized transport of beach related items across soft sand.

2. Objects and Advantages

It is an object of this invention to provide a motorized beach cart which is not only useful for transporting items typically desired for a beach outing, but which also provides a means of storing these items, when not in use, with the least amount of manual labor.

Another object of this invention is to provide a power assisted means to conveniently transport through soft sand, those items typically desired at a beach.

It is a further object of this invention to provide a motorized beach cart that provides a comfort station with a tabletop and cup holders around which beach chair can be positioned with minimal handling of a beach umbrella.

Another object of this invention is to provide a means to securely fasten and transport a beach umbrella, both fully attached to the platform and cargo frame for transport or easily secured to the cart and into the sand during strong wind.

An additional object of this invention is to provide a motorized beach cart that may be used for convenient storage of beach items when not in use.

These and further objects of the invention will become apparent from the accompanying figures and detailed description.

SUMMARY

In accordance with the present invention a motorized beach cart comprises a cart platform and cargo frame, to contain the items being transported, attached to a propulsion assembly that provides propulsion to a pair of motorized front wheels. A rear caster wheel affixed to the platform provides the capability to steer the cart. A rechargeable battery provides the power source for the motorized beach cart. A control handle provides easy steering and operation of the motorized beach cart. An electronic circuitry is electrically engaged between the battery and each of the drive motors to provide variable speed, power and direction control. The motorized beach cart is provided with a utility rack that is designed to carry a dry storage box and beach bags without infringing on the use of the cart platform. In addition, the closed button tubular cargo transport column provides for the secure transport and storage of a beach umbrella. Other tubular cargo transport columns provide for the secure carrying of other beach items like fishing poles. Also, provided is a removable tabletop with cup holders that can serve as a convenience station once at a beach. One open bottom tubular cargo column provides for the securing of a beach umbrella to the cart and the sand, for use during strong wind.

DRAWINGS—FIGURES

The invention will be better understood by reference to the accompanying drawings, wherein.

DRAWINGS - REFERENCE NUMBERS

| | | | |
|---|---|---|---|
| 21 | motorized beach cart | 22 | cart platform |
| 23 | propulsion assembly | 24 | tubular cargo frame assembly |
| 25 | control handle | 26 | master power switch |
| 27 | direction switch | 28 | circuit breaker |
| 29 | pulse code modulated trigger assembly | 30 | battery charging port |
| 31 | utility rack assembly | 32 | tabletop |
| 33 | cup holder | 34 | tubular column |
| 35 | open bottom tubular column | 36 | rear caster assembly |
| 37 | tire and wheel assembly | 38 | battery compartment door |
| 39 | cargo frame column | 40 | front axle |
| 41 | bottom rail | 42 | middle rail |
| 43 | top rail | 44 | utility rack column |
| 45 | utility rack rail | 46 | wide wheel assembly |
| 47 | wide tire with raised center | 48 | electric motor control assembly |
| 49 | motor support structure | 50 | hub to motor adapter |
| 51 | geared motor assembly | 52 | battery compartment support structure |
| 53 | electronics compartment | 54 | rear axle |
| 55 | axle cap | 56 | propulsion housing |
| 57 | umbrella | 58 | dry storage box |
| 59 | cooler | 60 | retainer clip |
| 61 | rechargeable battery | 62 | power select relay |
| 63 | direction relay | 64 | high current circuit breaker |

DETAILED DESCRIPTION—FIGS. 1 AND 2—PREFERED EMBODYMENT

Referring initially to FIGS. 1, 2, 2A, 2B and 2C of the drawings, in a first preferred embodiment the motorized beach cart of this invention is generally illustrated by reference numeral 21. The motorized beach cart 21 is characterized by a cart platform 22, and includes a tubular cargo frame assembly 24, supported and propelled by a laterally mounted propulsion assembly 23 and a rear caster assembly 36 controlled and steered to location with a rearward mounted control handle 25 and a electric motor control assembly 48. Also, in a first preferred embodiment the motorized beach cart of this invention is a commercially available pulse code modulated trigger assembly 29 to control speed and a utility rack assembly 31.

Figure 1:
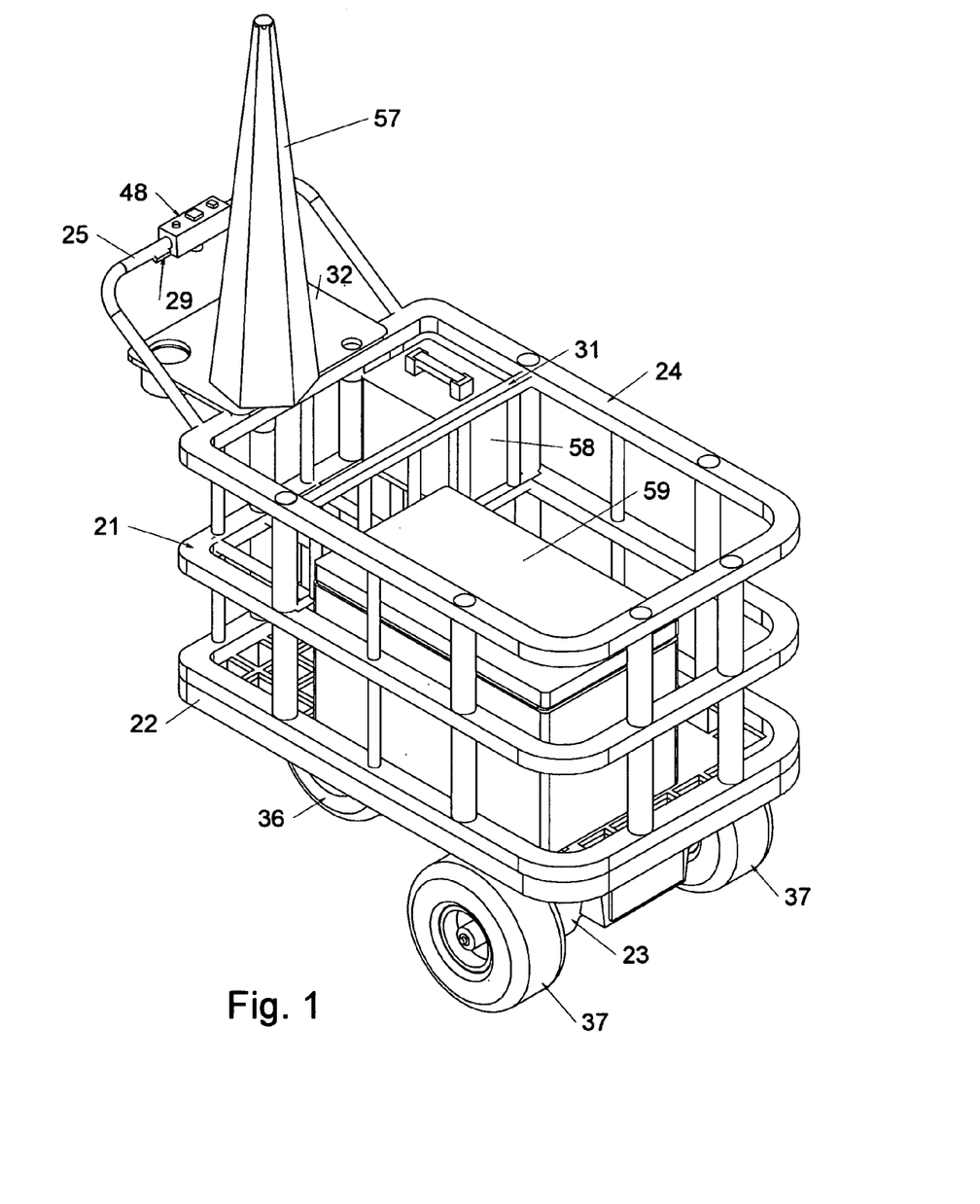
FIG. 1 is a perspective view of a first preferred embodiment of the motorized beach cart of this invention showing the cart loaded with items representing those typically found useful for fuller enjoyment of a beach.

The tabletop 32 mounts through the top rail 43 into the top of two of the tubular columns 34 still allowing cylindrical items like the pole of an umbrella 57 to pass vertically and be supported on the bottom at the plane of the cart platform 22 and on the sides by the tubular column 34 itself, during transport or storage. An open bottom tubular column 35 allows an umbrella 57 to pass through the cart platform 22 and extend into the sand when the motorized beach cart is being used as a convenience station at a beach during strong wind. The tabletop 32 includes cup holders 33 for use as a convenience station at a beach. The motorized beach cart is shown in FIG. 1 with a cooler 59 located on the cart platform 22 and a dry storage box 58 for smaller items being transported or stored on the utility rack assembly 31.

Figure 2:
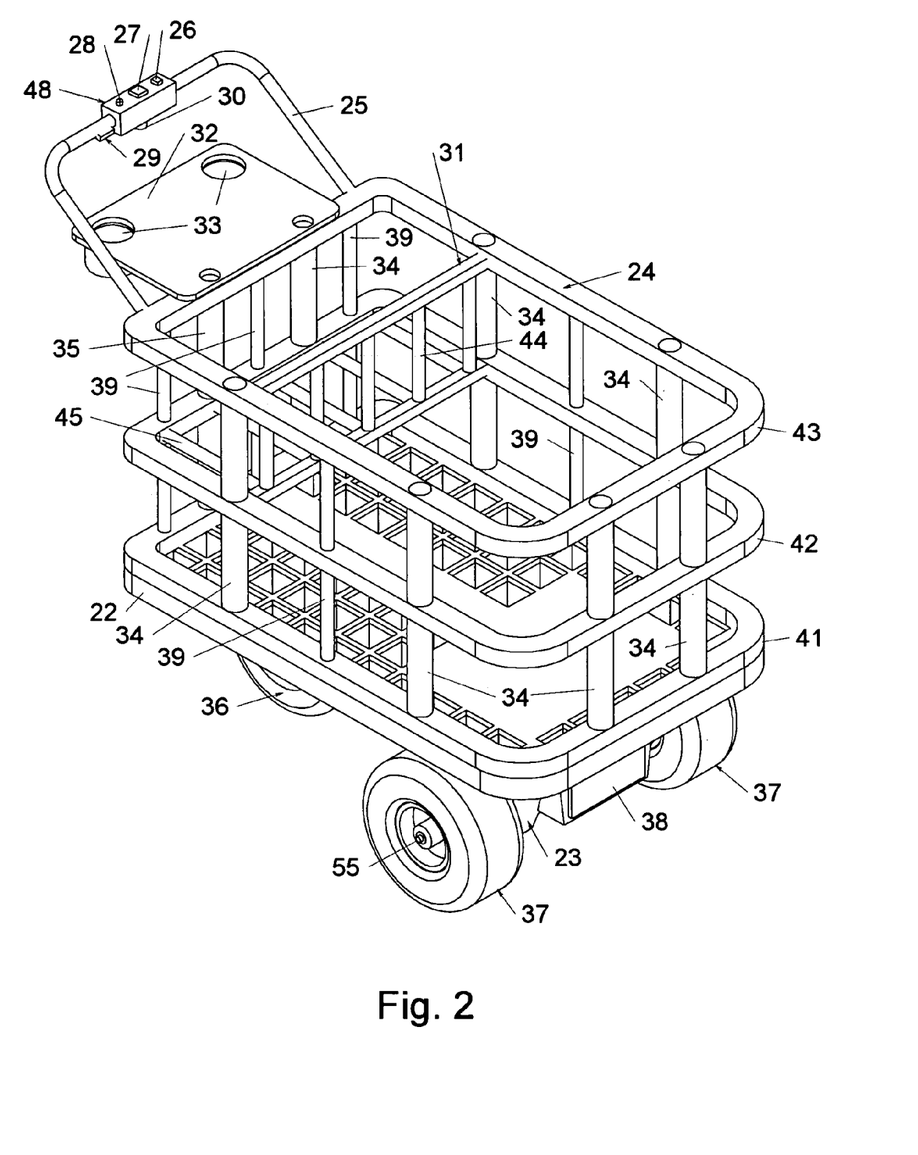
FIG. 2 is a perspective view showing all of the components of the empty motorized beach cart illustrated in FIG. 1.
Figure 2A:
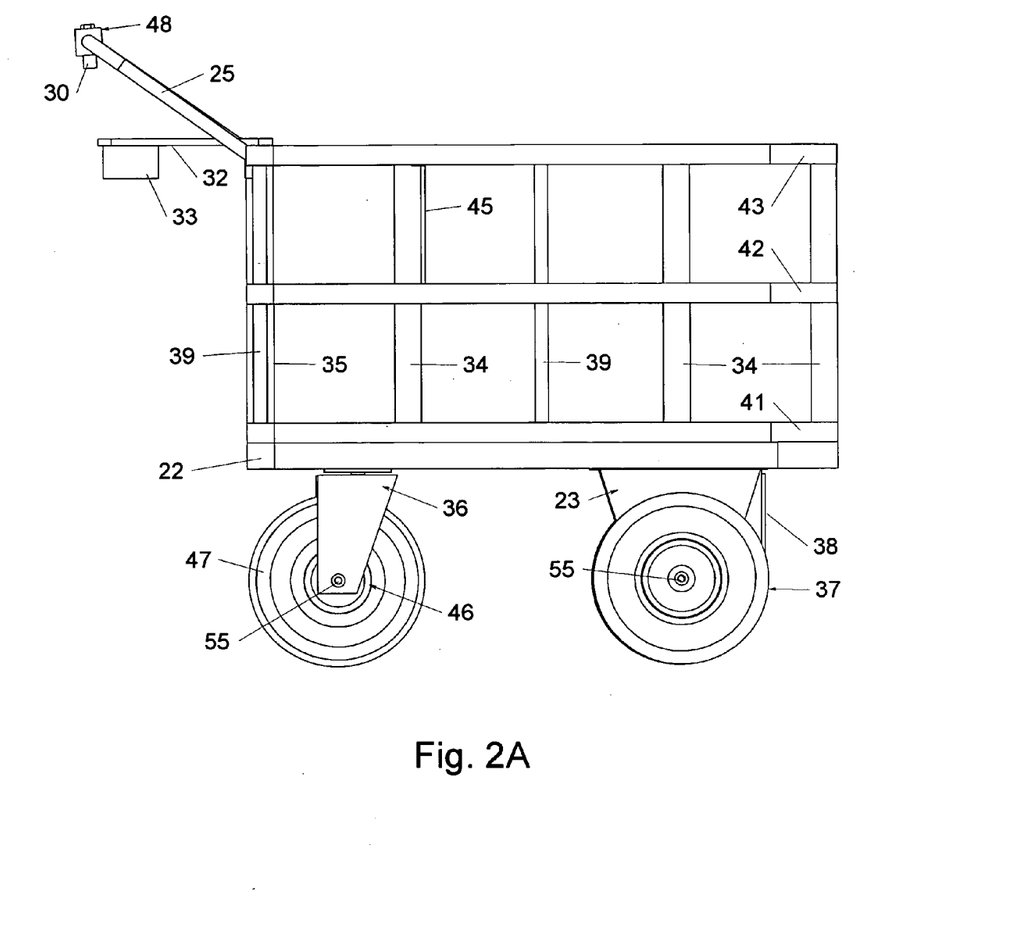
FIG. 2A is a sectional view taken along the left side of the motorized beach cart illustrated in FIG. 2.
Figure 2B:
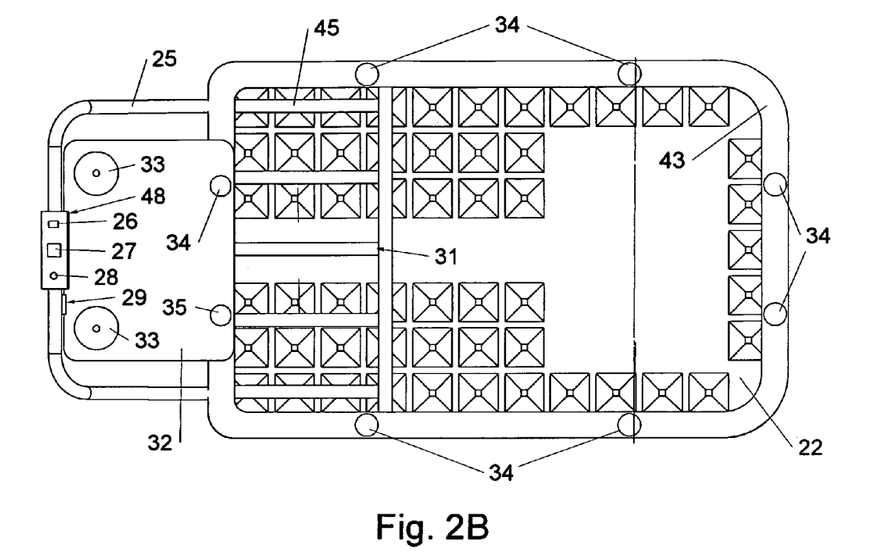
FIG. 2B is a sectional view taken along the top of the motorized beach cart illustrated in FIG. 2.
Figure 2C:
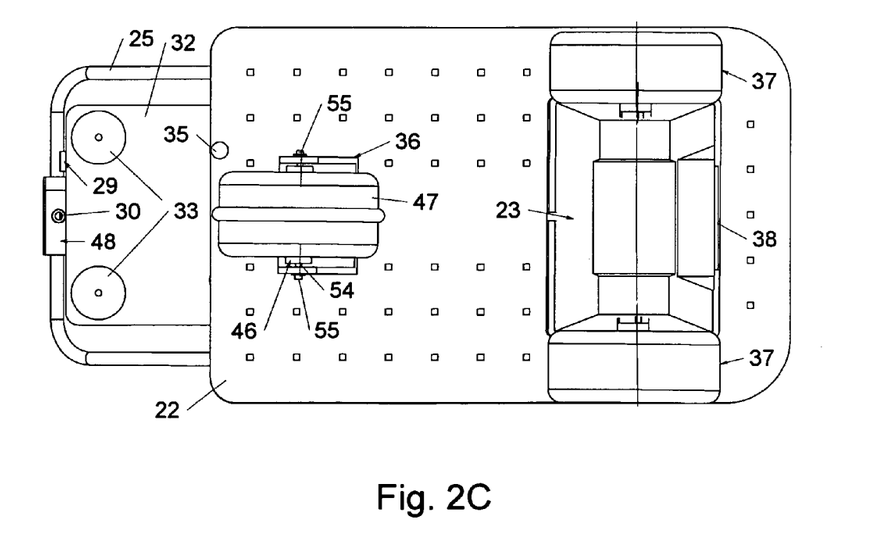
FIG. 2C is a sectional view taken along the bottom of the motorized beach cart illustrated in FIG. 2.

The propulsion assembly 23 includes two commercially available tire and wheel assemblies 37 held to a common front axle 40 with an axle cap 55 and a battery compartment door 38.

The cart platform 22 supports those items typically required for beach recreation while allowing loose sand to fall back to the beach. More specifically, the cart platform 22 is divided into sections where there is a clear path beneath the platform. Each section is extruded downward for strength, and the sidewall of the section are angled inward to almost close the bottom of the section.

The tubular cargo frame assembly 24 comprises a top rail 43, and a bottom rail 41, and a middle rail 42, through which tubular columns 34, one open bottom tubular column 35 and cargo frame uprights 39 pass vertically. Attached to the top rear side and the rear of the tubular cargo frame assembly 24 along the centerline is a utility rack assembly 31, consisting of a utility rack columns 44 and a utility rack rails 45. A control handle 25 is attached to the rear of the top rail 43 in equal relation to the centerline and at an upward angle to make access to the electric motor control assembly 48 comfortable to the user.

The electric motor control assembly 48 includes a master power switch 26, a direction switch 27, a circuit breaker 28 and a battery charging port 30.

The rear caster assembly 36 comprises a wide wheel assembly 46 fitted with an wide tire with raised center 47 that is designed to roll easily over soft sand and swivel easily on hard surfaces.

Figure 3:
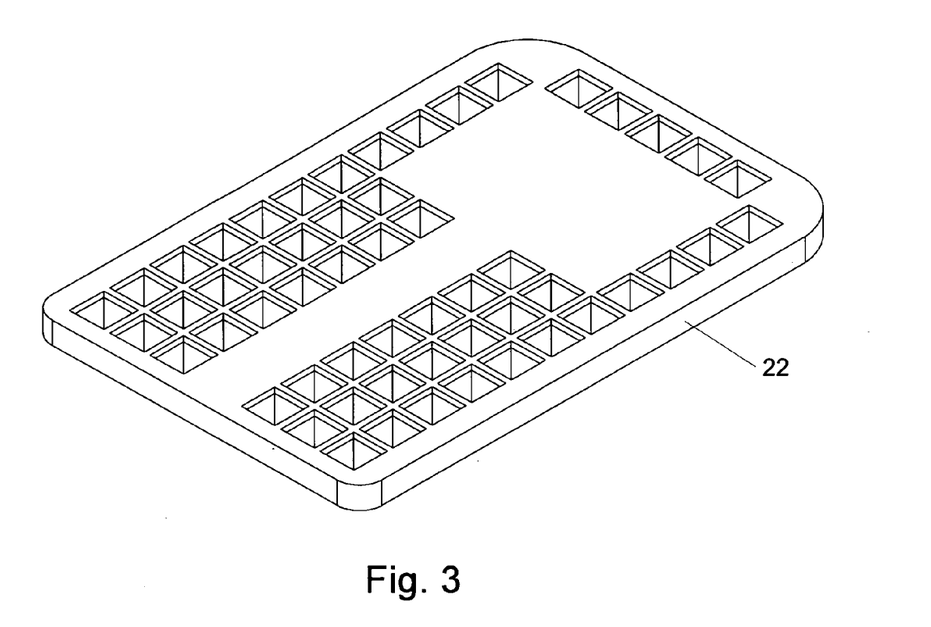
FIG. 3 is a perspective view of the motorized beach cart platform illustrated in FIG. 2.
Figure 3A:
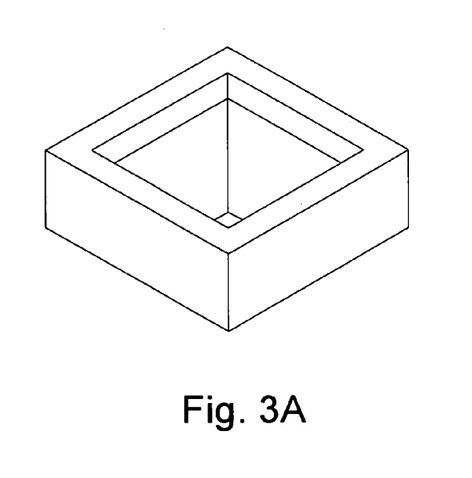
FIG. 3A is an expanded perspective view taken along the left rear side of a segment of the motorized beach cart platform illustrated in FIG. 3.
Figure 3B:
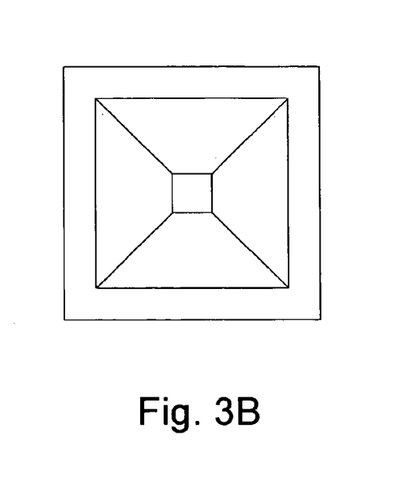
FIG. 3B is an expanded sectional view taken along the top side of a segment of the motorized beach cart platform illustrated in FIG. 3.

Referring now to FIGS. 1, 2 and 3 of the drawings, in a most preferred embodiment of the invention the cart platform 22 supports the transport to a beach and storage of those items typically required for beach recreation. The platform utilizes a grid structure with a semi-closed bottom. More specifically, said grid includes sections that are extruded downward one quarter of said section total depth, and the sidewalls of said section are angled inward three quarters of said section depth, to almost close the bottom of said section. The sloped sides of said section shown in FIGS. 3A and 3B, which is a subset of the cart platform 22, allow loose sand to fall back to the beach during loading and transport. For clarity, note that the bottom plane of FIG. 3A and FIG. 3B is open in the small square area depicted in the center of said section. This design also allows easy clean up of the beach items transported without unloading the motorized beach cart, before storage.

Figure 4:
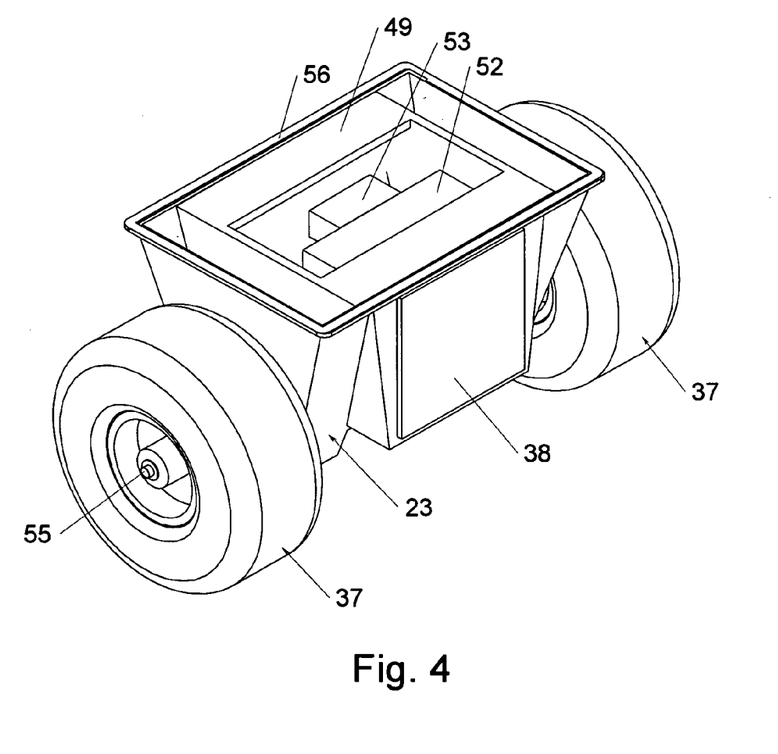
FIG. 4 is a perspective view of the propulsion assembly of the motorized beach cart showing the components of the propulsion assembly illustrated in FIG. 2.
Figure 5:
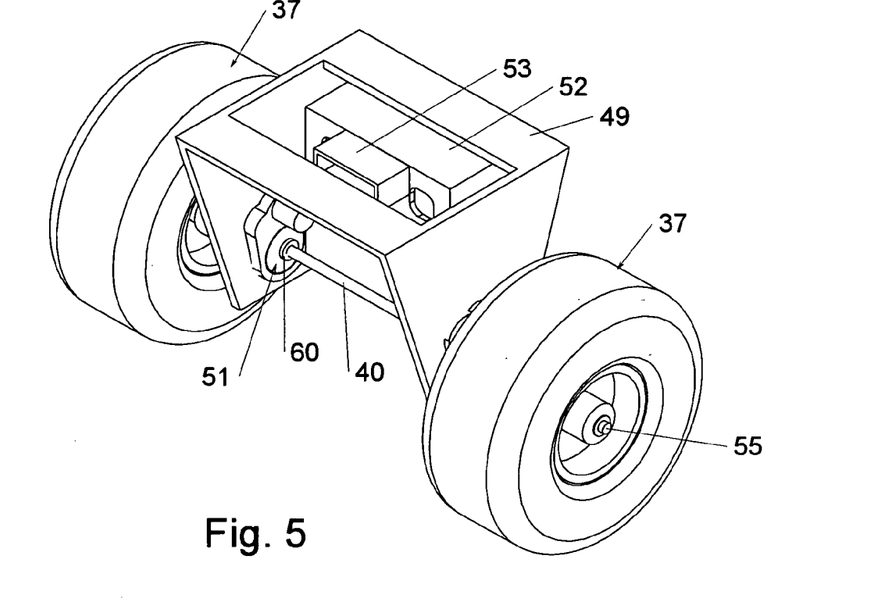
FIG. 5 is a perspective view of the propulsion assembly of the motorized beach cart illustrated in FIG. 4 with the propulsion housing removed.
Figure 5A:
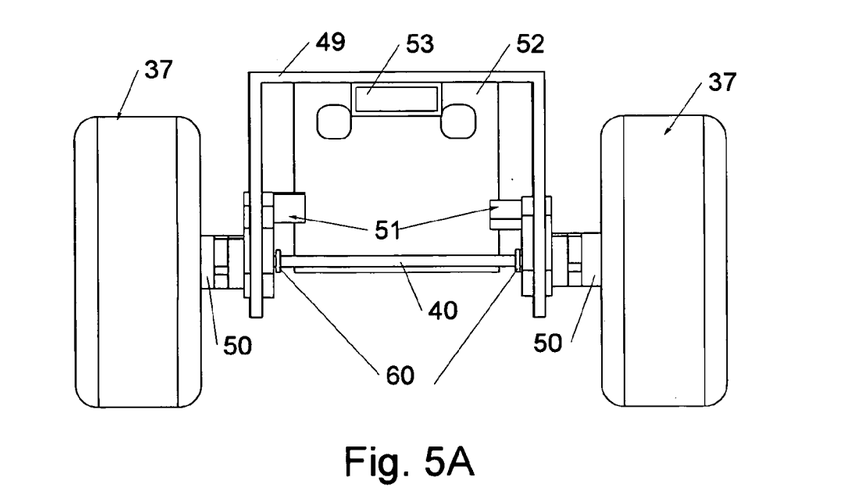
FIG. 5A is a sectional view taken along the front of the propulsion assembly of the motorized beach cart illustrated in FIG. 5.
Figure 6:
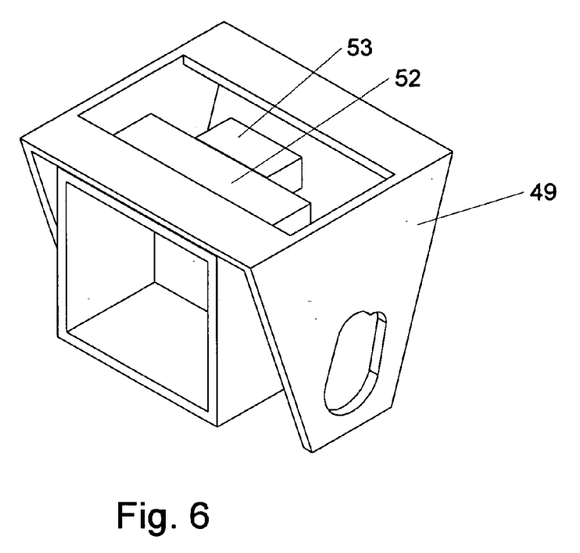
FIG. 6 is a perspective view of the motorized drive support structure of the motorized beach cart propulsion assembly illustrated in FIG. 5.
Figure 6A:
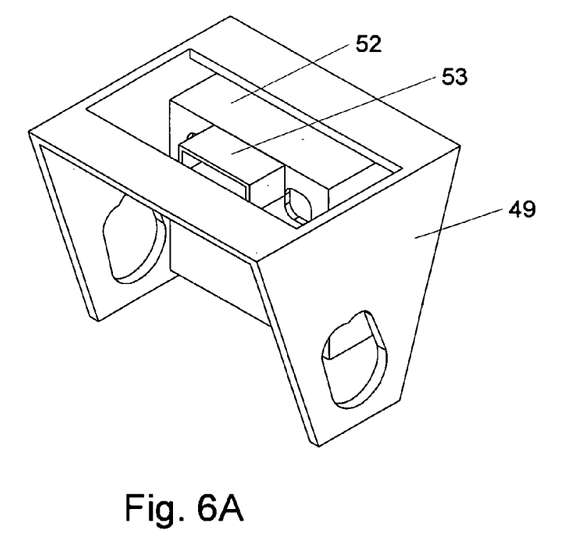
FIG. 6A is a rear perspective view of the motorized drive support structure of the motorized beach cart propulsion assembly illustrated in FIG. 5.

Referring now to FIGS. 2 and 4 of the drawings, in a most preferred embodiment of the invention a propulsion assembly 23 supports the front end of the cart platform 22 and projects downward from the cart platform 22 at a position equally across the centerline and rearward of the front edge by half the depth of the propulsion assembly 23. Propulsion is accomplished by transfer of rotational motion from a pair of geared motor assembly 51 to tire and wheel assembly 37 that are spaced in parallel relationship to the sides of the cart on a single front axle 40 with axle caps 55 and supported by a motor support structure 49 extending down from the bottom of the cart platform 22 inside the propulsion housing 56. Also, in a first preferred embodiment the motorized beach cart of this invention includes a battery compartment support structure 52 and a battery compartment door 38. The electronic circuitry is housed in the electronics compartment 53, and the entire sides and bottom of the propulsion assembly 23 is covered with a thin walled propulsion housing 56.

Referring now to FIGS. 2, 5, 5A, 6 and 6A of the drawings, in a most preferred embodiment of the invention a motorized drive system for the motorized beach cart, are views of the underlying structure of the propulsion assembly 23 with the propulsion housing 56 removed. The motor support structure 49 serves as the basic undercarriage for the entire drive assembly and is affixed to the underside of the cart platform 22 along its centerline in the front quadrant. The battery compartment support structure 52 is firmly affixed to the motor support structure 49 along its centerline and front edge. The electronics compartment 53 is affixed to the top rear and centerline of the battery compartment support structure 52. A geared motor assembly 51 is mounted in each end panel of the motor support structure 49, in a hole that exactly matches the front sectional view of the geared motor assembly 51. A common front axle 40 passes through the center of each of the geared motor assembly 51 and is held in place latterly by a retainer clip 60. The tire and wheel assembly 37 is firmly fixed to a hub to motor adapter 50 that is loosely coupled to the geared motor assembly 51, along the axis of a common front axle 40 with an axle cap 55 secured at each end.

Figure 7:
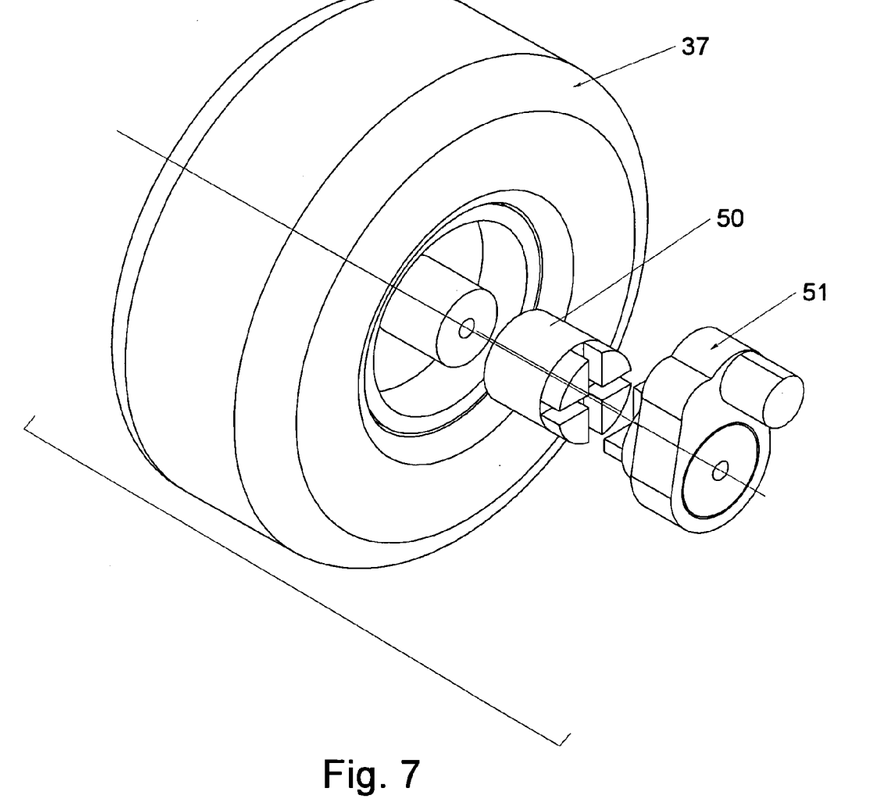
FIG. 7 is an expanded perspective view taken along the center line of the front axle of the front wheel power assembly of the motorized beach cart illustrated in FIG. 2, more particularly illustrating how the motor is coupled to the high traction turf wheel and tire.
Figure 8:
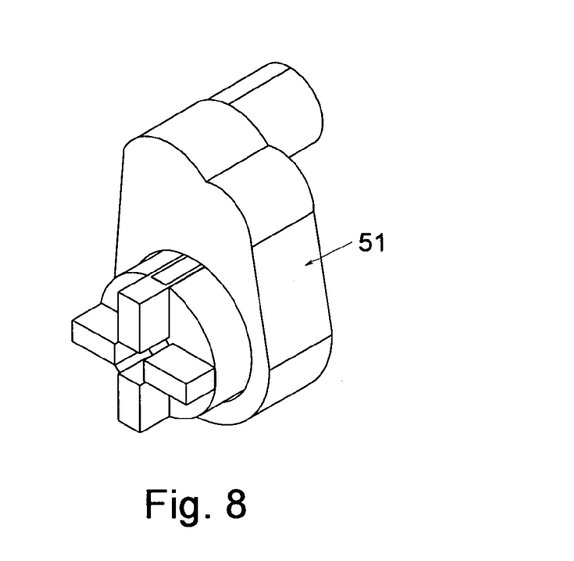
FIG. 8 is a perspective view of the commercially available motor illustrated in FIG. 7.
Figure 8A:
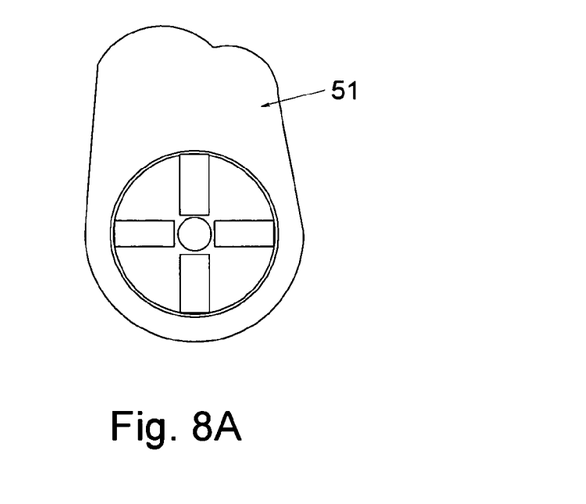
FIG. 8A is a section view taken along the front of the commercially available motor illustrated in FIG. 7.
Figure 9:
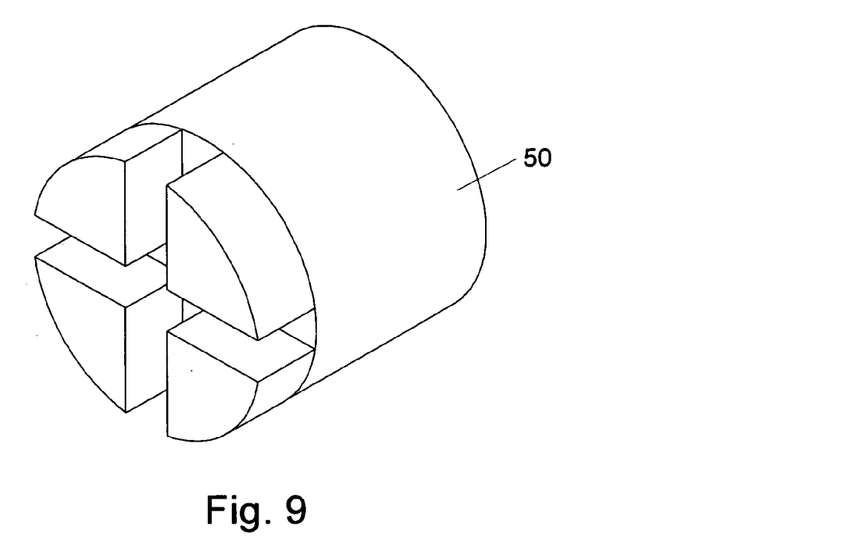
FIG. 9 is a perspective view along the right front of the wheel hub to motor adapter of the front wheel power assembly illustrated in FIG. 7.
Figure 9A:
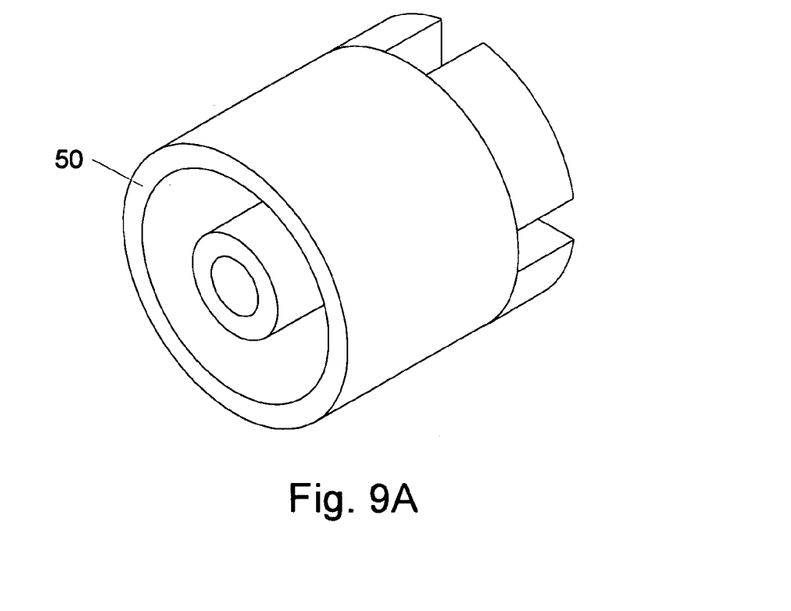
FIG. 9A is a perspective view along the left rear of the wheel hub to motor adapter of the front wheel power assembly illustrated in FIG. 7.
Figure 10:
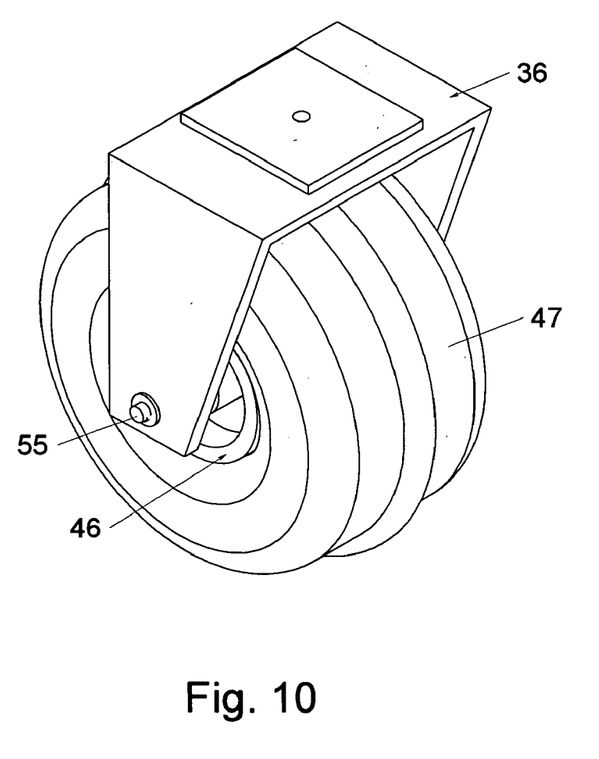
FIG. 10 is a view of the rear caster assembly of the motorized beach cart platform illustrated in FIG. 2.
Figure 11:
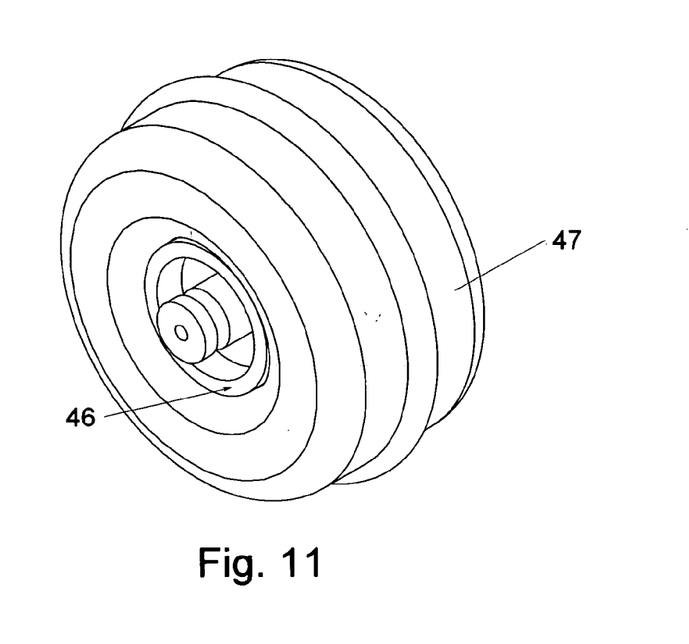
FIG. 11 is a perspective view of the rear wheel and tire of the rear caster assembly illustrated in FIG. 10.
Figure 11A:
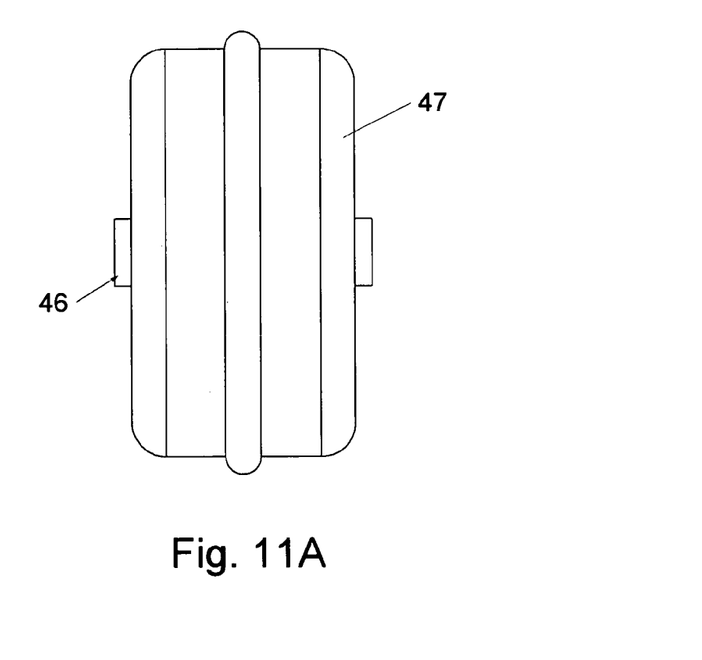
FIG. 11A is a front view of the rear wheel and tire illustrated in FIG. 11.

Referring now to FIGS. 2, 7, 8, 8A, 9 and 9A of the drawings, in a most preferred embodiment of the invention a motorized drive system for the motorized beach cart, are views of the mechanized portion of the propulsion assembly 23. The tire and wheel assembly 37, the hub to motor adapter 50 and the geared motor assembly 51 are all aligned along their center axis as illustrated in FIG. 7.

Referring now to FIGS. 2, 10, 11 and 11A of the drawings, in a most preferred embodiment of the invention a caster wheel for the motorized beach cart, are views of the rear caster assembly 36. The rear caster assembly 36 supports the rear end of the cart platform 22 and projects downward from the cart platform 22 at a position equally across the centerline and forward of the rear edge by half the diameter of the wide tire with raised center 47. The commercially available wide wheel assembly 46 is attached to the rear caster assembly 36 with a single rear axle 54 that passes latterly through the assembly and is held in place with axle caps 55. The wide tire with raised center 47 is improved for low resistance use on soft sand and easy swivel on a hard surface. The tire has a wide footprint to spread the weight of the motorized beach cart over a large area for transport through soft sand and a center mounted raised band around the circumference of the tire provides a narrow contact surface for transport on hard surfaces, thus allowing for easy swivel. The wide tire with raised center 47 mounts to the rim of the wide wheel assembly 46.

Figure 12:
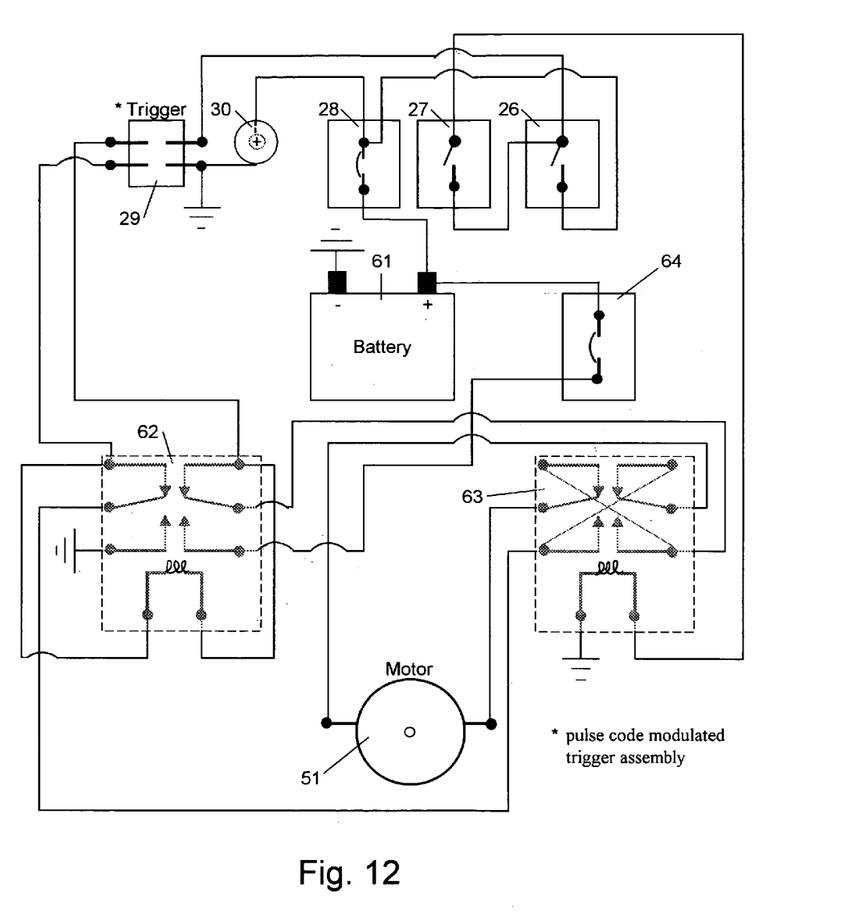
FIG. 12 is a schematic for the electronic control circuit for the motorized beach cart.

Referring now to FIG. 12 of the drawings, in a most preferred embodiment of the invention an electronic control circuit for the motorized beach cart, is the schematic for the electrical portion of the invention. More specifically, power is provided to the geared motor assemblies 51 by a 12-volt rechargeable battery 61. Power is applied through a circuit breaker 28 to the master power switch 26. When in the on position the master power switch 26 powers the pulse code modulated trigger assembly 29 and the direction switch 27. The battery charging port 30 is connected between the pulse code modulated trigger assembly 29 and the output of the circuit breaker 28. Regulated power from the pulse code modulated trigger assembly 29 is routed through a double pole double throw power select relay 62 to the geared motor assemblies 51 through a double pole double throw direction relay 63. Power select relay 62 determines if the geared motor assemblies 51 are feed with power from the pulse code modulated trigger assembly 29 or directly from the rechargeable battery 61.

The normally closed state of power select relay 62 provides power from the pulse code modulated trigger assembly 29. As the trigger is pressed beyond 75 percent, the power select relay 62 energizes and transfers to the closed state, applying maximum current to the geared motor assemblies 51 by providing a direct electrical path from the rechargeable battery 61 instead of the pulse code modulated trigger assembly 29. Due to the high current load of the geared motor assemblies 51 under heavy load a high current circuit breaker 64 is deployed between rechargeable battery 61 and the geared motor assemblies 51 when the power select relay 62 energizes. The normal state for the direction switch 27 is off, thus the normal state direction of travel is forward. When the direction switch 27 is turned on the direction relay 63 is energized, thus the direction of travel is reversed.

Operation—FIGS. 1, 2, 12

The manner of using the motorized beach cart to transport items to a beach is similar to that of carts in present use. Namely, one first loads the items to be transported to a beach. Next, instead of pushing or pulling the cart to a beach one turns on the master power switch 26 on the electric motor control assembly 48, selects the direction of intended travel with the direction switch 27 and, using one hand on each side of the control handle 25, one depresses the pulse code modulated trigger assembly 29 with a finger on said right hand. The motorized beach cart can be easily steered with the control handle 25 for transport of said items to a beach and back. The rate of advance is controlled by the amount of inward movement that is applied to the pulse code modulated trigger assembly 29. To stop movement of the motorized beach cart, one releases the pressure of the finger on the pulse code modulated trigger assembly 29. After each use of the motorized beach cart, the rechargeable battery 61 is recharged through the battery charging port 30.

Advantages

From the description above, a number of advantages of my motorized beach cart become evident:

(a) The propulsion assembly eases the burden of transporting those items typically required for beach recreation through soft sand, allowing the user to carry more items to a beach for a richer experience.

(b) The cart platform assists in the removal of loose sand from those items typically used for beach recreation during loading and transport. It also allows for wash-off of those items without removal from the cart allowing the user to spend less time and effort on that task.

(c) The wide profile tire with the center mounted raised band eases the effort traversing soft sand and allows the user to easily maneuver the cart in tight places while on hard surface.

(d) The variable speed capability allows the user to walk behind the cart at a comfortable pace, and allows fine motion control when parking the motorized beach cart for storage.

(e) The closed bottom tubular cargo transport columns allow the user to place a beach umbrella on the cart for transport and to simply raise the umbrella at a beach to enjoy the shade that it provides, thus avoiding the hassle to moving the umbrella during set-up.

(f) The open bottom tubular cargo column allows the user to place a beach umbrella vertically through the cargo frame of the cart into the sand for use of the umbrella during strong wind.

(g) The tabletop with cup holders provides a convenient place to have refreshments on a beach, thus avoiding the problem of where to sit refreshments.

Conclusion, Ramification, Scope

Accordingly, the reader will see that the motorized beach cart of this invention can be used to transport and store beach related items with less manual labor and effort. Furthermore, the motorized beach cart has the additional advantage in that:

Less sand is removed from the beach;

Beach items can be washed off without removing them from the cart, saving time and effort;

Refreshments can be easily served using the tabletop and cup holders, eliminating the need to carry additional items to a beach.

Less handling of a beach umbrella is required to transport and set-up.

Although the description above contains many specifications, these should not be construed as limiting the scope of the invention but as merely providing illustrations of some of the presently preferred embodiments of this invention. For example the motorized beach cart could be used for non-beach activity where the transport and storage of other items is a need.

Thus the scope of the invention should be determined by the appended claims and their equivalents, rather than by the examples given.

I claim:

1. A motorized cart improved for transporting over sandy terrain those items typically found useful for fuller enjoyment of a beach, comprising:
    (a) a generally rectangular platform, having a front end and a rear end, that includes sections that are extruded downward and angled inward from each side of the sections until the angled portions of the said section come into close proximity of each other, but do not touch;
    (b) a cargo frame attached to the top of said platform that consists of a plurality of tubular columns and a plurality of tubular rectangular rails where said tubular columns pass vertically through the top and middle rails and connect to the bottom said tubular rectangular rail; the tubular rectangular rails are generally the same outside dimensions as the horizontal plane of said platform; a plurality of other cargo frame columns pass vertically through the said middle rail and connect to the said top and bottom rails;
    (c) a propulsion assembly, mounted transversely to the bottom of said platform, supports the front end of said platform, providing mountings for motorized front wheels fixedly mounted in rotatable relationship along an axle defining the axis around which the tire and wheel assembly rotates, a battery compartment and a compartment to house the electronic circuit used to power the cart;
    (d) a caster wheel assembly, wherein said tire is flattened cross-sectionally with a center mounted raised band disposed on the tire surface in a circumferential direction, being rotatable about a second axis longitudinally and rotatably mounted by wheel brackets to the rear end of said platform;
    (e) a rechargeable battery positioned in front of the front axel provides the power source for the motorized cart;
    (f) a control handle containing a master power switch, a direction switch, a circuit breaker, a pulse code modulated trigger assembly and a battery charging port is supported by the rear end of the top rail of said cargo frame in equal relation to the centerline and at an upward angle, for steering and operating the motorized portion of said motorized cart, whereby said motorized cart will be self-propelled along a surface.

2. The motorized cart of claim 1 wherein the two front tire and wheel assemblies are coupled to geared motor assemblies via a hub to motor adapter at each end of an single axle producing rotational force for transporting the cart across a surface, including sandy terrain.

3. The motorized cart of claim 1 wherein an electric motor control circuit provides direction control, variable speed control and a high current direct battery connection a pulse code modulated trigger assembly provides pulsed battery current to said geared motor assemblies providing variable speed during low speed operation, a power select relay is energized when the cart is operated above low speed and provides a high current direct connection between the said battery and the said geared motor assemblies to produce maximum available rotational force from said geared motor assemblies.

4. The motorized cart of claim 1 further comprising of at least one tubular column that pass through the top, middle and bottom tubular rectangular rails and passes through said platform for removably receiving a long cylindrical item, such as a beach umbrella, that can pass vertically through the cart into the sandy surface upon which said cart sits.

5. The motorized cart of claim 1 further comprising of at least one removable tabletop containing a plurality of cup holders that can be disposed on either front or rear of the cargo frame into said tubular columns.

6. The motorized cart of claim 1 further comprising a plurality of columns and rails forming a front and a bottom of a utility rack that is located above the cart platform and attached directly to the rear section of the middle said tubular rectangular rail and the rear side of the top said tubular rectangular rail.

* * * * *